Sept. 26, 1944. J. R. SCHNAIDT 2,359,005
PLANT CHOPPER
Filed May 12, 1942 2 Sheets-Sheet 1
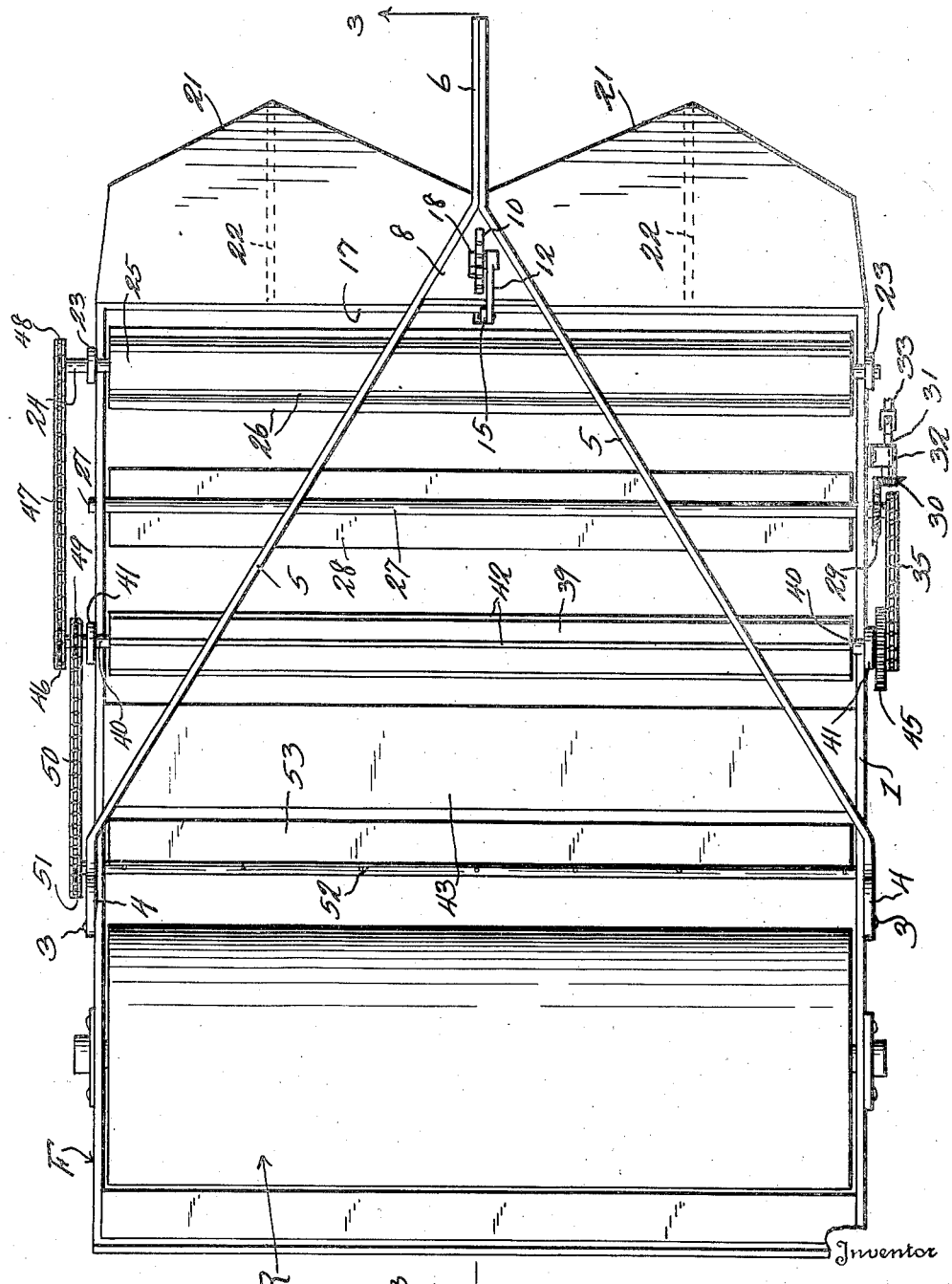
Inventor
John R. Schnaidt
By Watson E. Coleman
Attorney

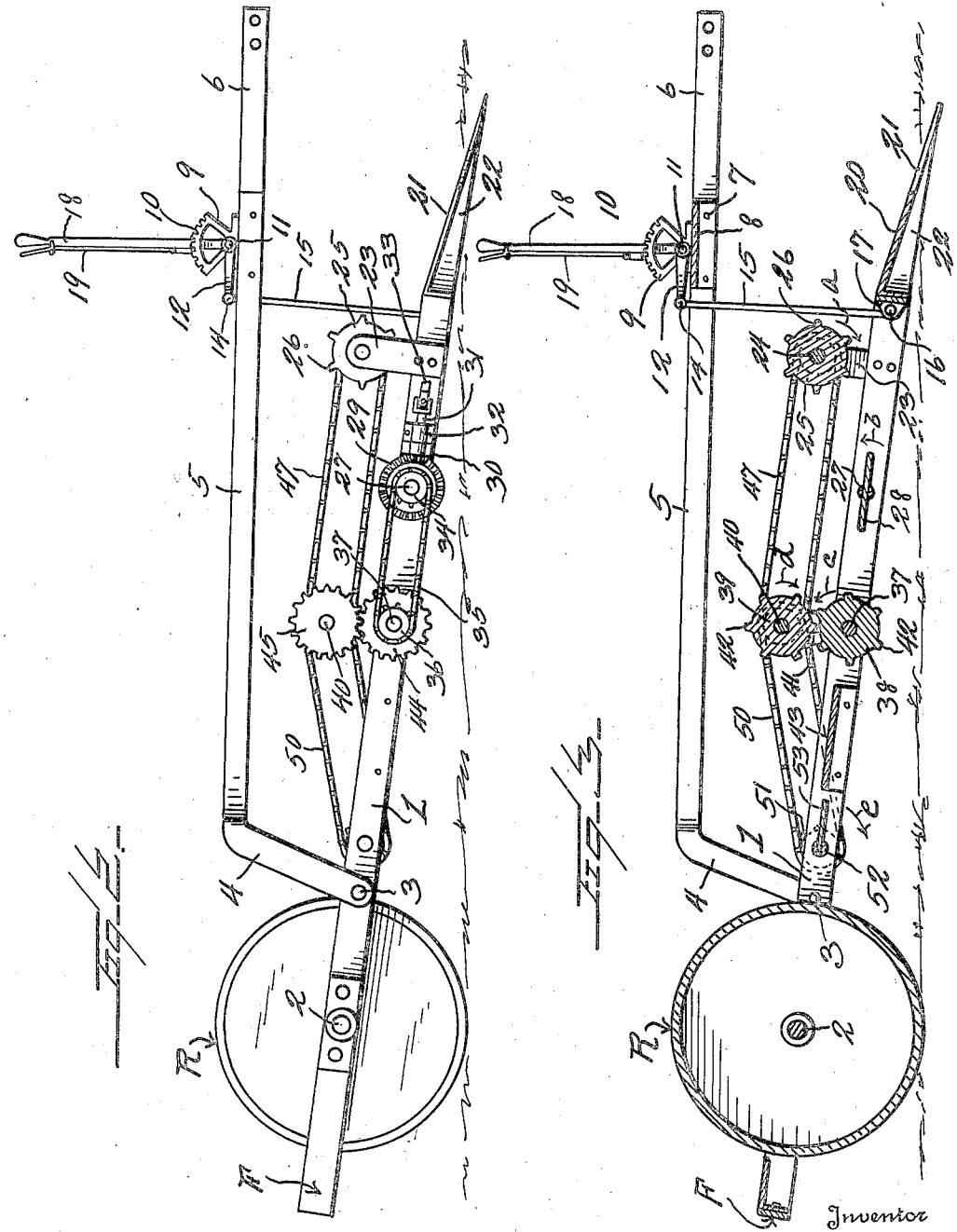

Patented Sept. 26, 1944

2,359,005

UNITED STATES PATENT OFFICE 2,359,005

PLANT CHOPPER

John R. Schnaidt, Shafter, Calif.

Application May 12, 1942, Serial No. 442,681

4 Claims. (Cl. 55—118)

This invention relates to a cotton plant chopper and it is an object of the invention to provide a machine of this kind which operates to dig up the cotton plants, chop the same and then return the chopped plants back into the soil.

It is also an object of the invention to provide an invention of this kind which is adapted to be hitched to a tractor and wherein certain of the working parts of the machine are operated from the power take-off or other driven part of the tractor.

A still further object of the invention is to provide a machine of this kind provided with means for plowing up the plants and wherein such lifted plants are carried to a chopping element for cutting up the plants, together with further means for pressing the cut-up plants back into the soil.

The invention consists in the details of construction and in the combination and arrangement of the several parts of my cotton plant chopper whereby certain advantages are attained, as will be hereinafter more fully set forth.

In order that my invention may be better understood, I will now proceed to describe the same with reference to the accompanying drawings, wherein:

Figure 1 is a view in top plan of a chopping machine constructed in accordance with an embodiment of my invention.

Figure 2 is a view in side elevation of the machine as illustrated in Figure 1, and Figure 3 is a longitudinal vertical sectional view taken substantially on the line 3—3 of Figure 1.

As disclosed in the accompanying drawings, F denotes a rectangular frame of desired dimensions and which has interposed between its side members 1 closely adjacent to the rear of the frame a pressing roller R. This roller R is mounted upon and rotates with a shaft 2, the extremities of which are disposed through and are rotatably supported by the side members 1 of the frame F.

Pivotally connected, as at 3, to the side members 1 of the frame F at a point in advance of but immediately adjacent to the roller R are the lower end portions of the upstanding and relatively short arms 4. The upper portions of these arms 4 are continued by the inwardly converging elongated arms 5 of a length to meet at a point in advance of the frame F and continued by the forwardly disposed contacting and connected members 6 providing a bar adapted to be suitably hitched or coupled to a tractor for drawing the machine over the field to be worked.

The arms 5, as illustrated in Figure 1 of the drawings, have their forward ends meeting at substantially the transverse center of the frame F and said meeting portions of the arms 5 have interposed therebetween and suitably secured thereto, as at 7, a plate or table 8. Suitably fixed to this plate or table 8 is an upstanding bracket 9 having its upper edge portion formed to provide an arcuate rack 10.

Disposed through the lower portion of this bracket 9 is a stub shaft 11 which extends beyond opposite sides of the bracket. To one end portion of this shaft 11 is fixed a rearwardly disposed rock arm 12 having operatively connected thereto, as at 14, the upper end portion of a depending rod 15 of desired length. The lower end portion of this rod 15 is operatively connected, as at 16, to the front cross member 17 of the frame 7 at substantially the transverse center of the frame.

The opposite end portion of the shaft 11 has fixed thereto the lower extremity of an upstanding hand lever 18 carrying a conventional latch mechanism 19 for coaction with the rack 10. By proper manipulation of the lever 18, the forward end portion of the frame F may be raised or lowered as the requirements of practice may desire and said forward end portion of the frame F will be maintained in desired selected swinging adjustment by locking connection between the latch mechanism 19 and the rack 10.

Suitably and rigidly secured to the front cross member 17 of the frame F and extending entirely across said frame is a forwardly directed flat blade 20 disposed on a desired downward incline with respect to the frame F. The forward marginal portion of this blade 20 is formed to provide a pair of penetrating members 21, so that the machine can be employed to advantage in lifting plants in two adjacent rows.

I do not wish to be understood as limiting myself to any particular construction of the blade 20 but in the present embodiment of my invention the under surface of the blade is provided thereacross with transversely disposed and depending reinforcing webs or flanges 22, there being one of these webs or flanges 22 directly behind each of the points of the blade.

The side members 1 of the frame F in close proximity to the forward cross member 17 are provided with the upstanding arms 23 which are rotatably engaged by the extremities of a shaft 24 for a rotating roller 25. This roller 25 is of a length substantially equal to the width of the frame F and has radiating outwardly therefrom a plurality of ribs 26 extending lengthwise of the roller 25 from end to end. These ribs 26 are equidistantly spaced around the roller 25. This member 25 is rotated forwardly and downwardly, as indicated by the arrow $a$ in Figure 3, to provide means to pass or move rearwardly the plants lifted by the plow blade 21.

Rotatably supported by the side members 1 of the frame F at a desired point rearwardly of the ribbed roller 25 is a shaft 27 and this shaft 27 carries a slat 28 of a length to substantially bridge the space between the side members 1 of the frame F. This slat 28 also equidistantly extends beyond opposite sides of the shaft 27 and serves as a further means to facilitate the rearward movement of the lifted plants. The shaft 27 and slat 28 rotate upwardly and rearwardly, as indicated by the arrow $b$ in Figure 2.

The shaft 27 has a portion extending to one side of the frame F and fixed to this extended portion of the shaft 27 is a bevel gear 29 meshing with a pinion 30 fixed to rotate with a stub shaft 31 rotatably held by a bearing 32 secured to the adjacent side member 1 of the frame. This shaft 31 is disposed in a direction lengthwise of the adjacent member 1 and the forward end portion of the shaft 31 is adapted to be suitably coupled or connected, as at 33, with the power take-off or other driven part of the tractor to which the machine is hitched or coupled.

The extended end portion of the shaft 27 provided with the gear 29 also has fixed thereto a sprocket wheel 34 around which passes an endless sprocket chain 35 also operatively engaged with a sprocket wheel 36 fixed to the extended end portion of a shaft 37. This shaft 37 is disposed transversely of the frame F and rotatably supported by the side members 1 thereof at a desired point rearwardly of the shaft 27. In the present embodiment of my invention and as particularly illustrated in the accompanying drawings, the shaft 27 is substantially midway between the shafts 24 and 37.

Fixed to rotate with the shaft 37 is a bottom roller 38 which extends substantially from one side of the frame to the other. This roller 38 underlies an upper roller 39 fixed to rotate with a shaft 40 extending transversely of the machine and rotatably supported by the upstanding arms 41 carried by the side members 1 of the frame F.

The rollers 38 and 39 are in close proximity one with respect to the other and are provided therealong at points equidistantly spaced therearound with the outstanding ribs 42. The plants, which are carried rearwardly by the members 25 and 28, pass between these rollers 38 and 39 and are delivered therefrom upon a table 43 interposed between the side members 1 of the frame F and secured thereto. This table 43 is flat and positioned below the top roller 39 and closely adjacent to the bottom roller 38. This table 43 is also relatively narrow.

The end portion of the shaft 37 provided with the gear 36 also has fixed thereto a gear wheel 44 which constantly meshes with a gear wheel 45 of equal diameter mounted upon an extended end portion of the shaft 40, whereby the rollers 38 and 39 are caused to rotate in unison, the bottom roller 38 moving upwardly and rearwardly, as indicated by the arrow $c$, while the upper roller moves downwardly and rearwardly, as indicated by the arrow $d$ in Figure 3.

The end portion of the shaft 40 remote from the gear 45 has fixed thereto a gear 46 around which passes a sprocket chain 47 also disposed around a sprocket wheel 48 on an adjacent extended end portion of the shaft 24 so that the member 25 will be caused to rotate in the required direction. The extended portion of the shaft 40 carrying the sprocket 46 also has fixed thereto a second sprocket 49 around which passes an endless sprocket chain 50 which is also operatively engaged with a sprocket 51 carried by the extended end portion of a shaft 52.

This shaft 52 extends transversely of the frame F and is rotatably supported by the side members 1 of said frame, and is positioned at a point inwardly of but in relatively close proximity to the table 43. This shaft 52 carries an outstanding cutting blade 53 of a length to extend substantially entirely across the frame 1 and as the shaft 52 is in rotation, this blade 53 chops up the plants delivered upon the table 43, being moved rearwardly thereacross under the action of succeeding plants being delivered to the table. The chopped plants are dropped down upon the ground surface and forced therein under the weight of the roller R as it travels thereover. As is indicated by the arrow $e$ in Figure 3, the shaft 52 rotates downwardly and rearwardly so that the blade 53 will have effective coaction with the table 43 to chop or cut up the plants passing across the table.

From the foregoing description it is thought to be obvious that a cotton plant chopper constructed in accordance with my invention is particularly well adapted for use by reason of the convenience and facility with which it may be assembled and operated.

What is claimed is:

1. A plant chopper comprising a relatively long frame, a rotating ground engaging supporting means for one end of the frame, a broad plow blade forming a forward and downward continuation of the other end of the frame, a longitudinally ribbed roller supported to extend transversely of the frame immediately behind the plow blade, a pair of super-imposed rollers supported transversely of the frame behind and in parallel relation with the first roller, means for rotating said rollers, the first roller being rotated in a direction to engage plants moving across the plow blade to shift the plants downwardly and rearwardly towards the super-imposed rollers, the super-imposed rollers being rotated together to engage and move a plant between them rearwardly and away from the plow blade and the first roller, an upwardly and rearwardly turning member extending transversely of the frame in the vertical space between the first roller and the super-imposed rollers and in the plane of the under one of the super-imposed rollers, and means carried by the frame upon the side of the super-imposed rollers remote from the first roller for chopping plants moving rearwardly from between these super-imposed rollers.

2. A plant chopper as set forth in claim 1 wherein the said upwardly and rearwardly turning member comprises a relatively wide slat extending transversely of the frame and supported at its ends for rotation.

3. A plant chopper comprising an elongated frame, rotatable ground engaging means supporting one end of the frame, a plow blade forming a forward and downward extension of the other and front end of the frame, means carried by the frame between the plow blade and the ground engaging supporting means for moving plants rearwardly from the plow blade and for chopping the plants, a draft hitch secured to the frame at opposite sides rearwardly of the plant moving and chopping means and in front of the rotatable ground engaging means and extending upwardly and forwardly beyond the plow blade, and means carried by the hitch above the plow blade and attached to the forward end of the frame for swinging the plow blade and the forward end of the frame upwardly on the rotary axis of the ground engaging means.

4. A plant chopper as set forth in claim 1 in which the chopping means comprises a table supported between the sides of the frame rearwardly and in the plane of the lower one of the super-imposed rollers, and a single elongated cutting blade extending transversely between the sides of the frame rearwardly of the table and supported for rotation on an axis line extending along one longitudinal edge whereby the other longitudinal edge of the blade passes across and in close proximity to the rear edge of the table for cooperation with the rear edge of the table in cutting plants.

JOHN R. SCHNAIDT.